US006304249B1

United States Patent
Derocher et al.

(10) Patent No.: US 6,304,249 B1
(45) Date of Patent: Oct. 16, 2001

(54) COLLAPSIBLE PORTABLE MOUSE

(75) Inventors: Michael D Derocher; Glen A Oross, both of Corvallis, OR (US); Jacques H Helot, San Mateo, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/405,601

(22) Filed: Sep. 24, 1999

(51) Int. Cl.[7] .................................................. G09G 5/08
(52) U.S. Cl. ........................................ 345/163; 248/118.1
(58) Field of Search .................................... 345/163–167, 345/156, 157, 158; D14/402–410, 432, 433; 248/118, 118.1, 118.3, 118.5; 361/683, 686

(56) References Cited

U.S. PATENT DOCUMENTS

| D. 359,479 | 6/1995 | Jondrow et al. ................... D14/114 |
| 4,754,268 | 6/1988 | Mori ..................................... 340/710 |
| 5,260,696 | * 11/1993 | Maynard, Jr. ...................... 345/163 |
| 5,414,420 | 5/1995 | Puckette et al. .................... 341/20 |
| 5,416,479 | 5/1995 | Jondrow et al. ................... 341/20 |
| 5,428,355 | 6/1995 | Jondrow et al. ................... 341/20 |
| 5,490,039 | 2/1996 | Helms ............................... 361/683 |
| 5,673,068 | 9/1997 | Jondrow et al. ................... 345/163 |
| 5,847,696 | * 12/1998 | Itoh et al. .......................... 345/163 |
| 5,894,303 | 4/1999 | Barr .................................. 345/163 |
| 5,920,306 | 7/1999 | Kikinis .............................. 345/158 |
| 5,990,870 | * 11/1999 | Chen et al. ........................ 345/163 |
| 6,075,516 | * 6/2000 | Rice .................................. 345/163 |
| 6,088,021 | * 7/2000 | Yong ................................. 345/163 |
| 6,157,370 | * 12/2000 | Kravtin et al. .................... 345/163 |

FOREIGN PATENT DOCUMENTS 63188715    7/1988    (JP) ............................... G06F/3/033

OTHER PUBLICATIONS

HP Revolutionizes Mouse Technology, Hewlett–Packard HDNS–2000 Solid–state Optical Mouse Sensor, Apr. 1999, pp 1–11 (and title page).

* cited by examiner

Primary Examiner—Regina Liang

(57) ABSTRACT

A computer mouse collapses into a smaller form. In one embodiment a cover slides to hide or reveal buttons and collapse or extend the length of the mouse. In another embodiment a lever is moved in one direction to bow the mouse surface and reveal buttons. Move the lever the other way and the mouse collapses in height and the buttons are hidden. In another embodiment a contoured leaf spring shapes the mouse. When relaxed, the spring is generally convex. Push down on the mouse and a latch captures the spring in an extended position reducing the height for storage and transport. Release the latch and the spring relaxes popping the mouse into an operable configuration. In another embodiment the mouse folds in half.

34 Claims, 5 Drawing Sheets

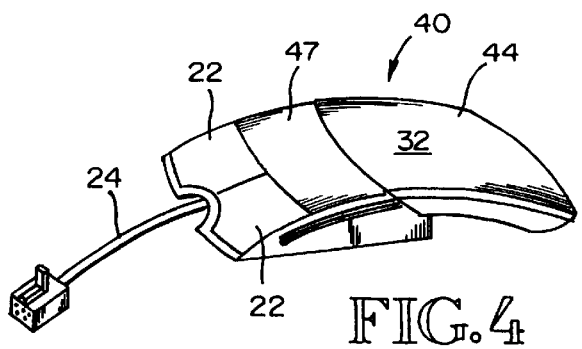
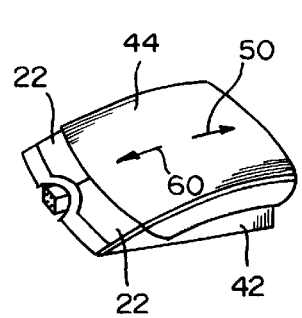
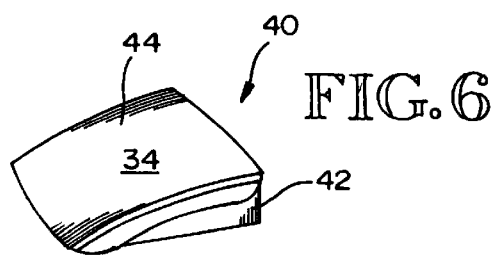
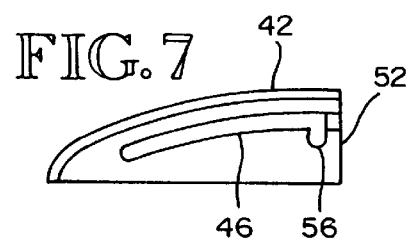
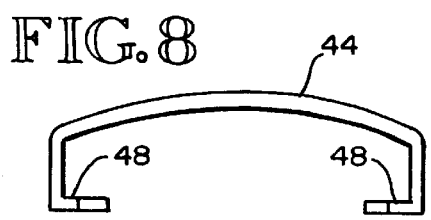
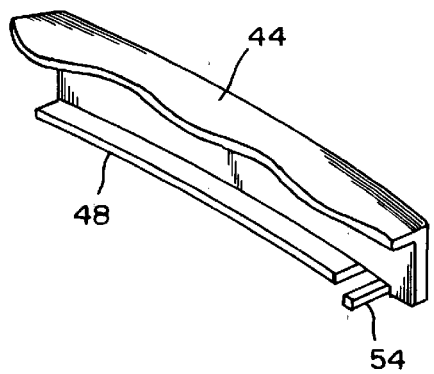
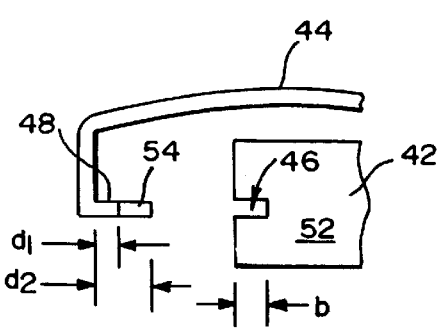

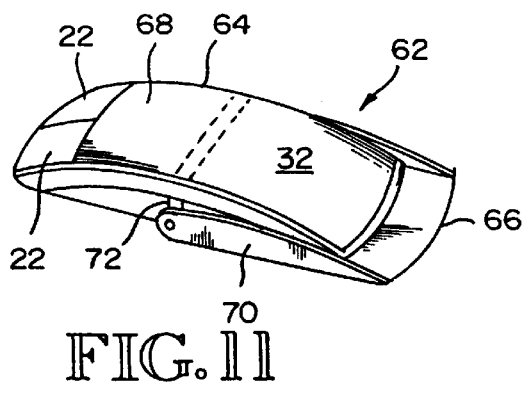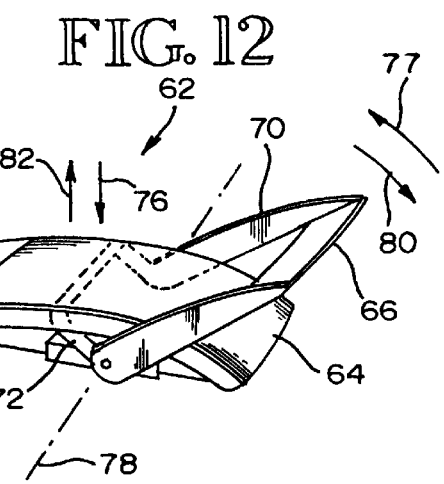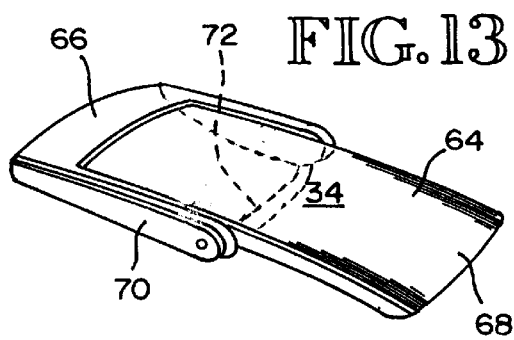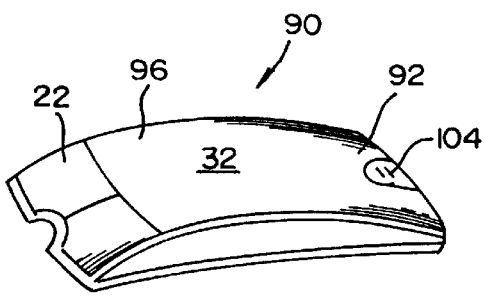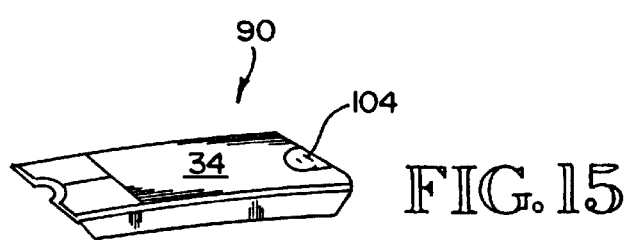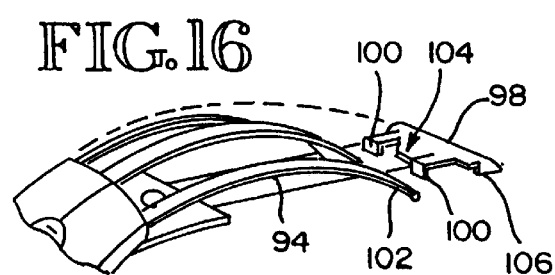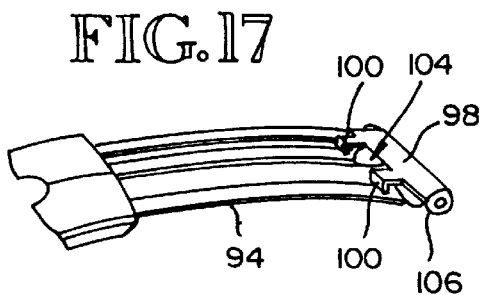

COLLAPSIBLE PORTABLE MOUSE

BACKGROUND OF THE INVENTION

This invention relates generally to input devices for a computer, and more particularly, to a manually controlled pointing device for a computer, such as a mouse.

A computer mouse is a common pointing device used to generate movement commands for controlling a cursor position displayed on a computer screen. The mouse sits to the side of the computer and resides on a flat surface, such as a mouse pad. Typically the mouse requires a substantially planar surface on which to move. A mechanical mouse includes a captured ball at an underside which rolls along the planar surface as an operator moves the mouse. The movement of the ball generates inputs to respective x,y directional sensors housed adjacent to the ball within the mouse. The x,y directional signals are input to the computer to control the cursor movement. Another kind of mouse, an optical mouse, includes a light emitting diode or phototransistor associated with a grid and providing a signal corresponding to distance and direction of mouse movement.

A computer mouse often includes one or more buttons which are either dedicated or programmed to correspond to specific command functions, (e.g., "click" to select a display icon; "double click" or open item corresponding to display icon; display a menu; drag icon to a new location on the screen; or some custom function). Other common computer pointing devices include a trackball, a touch pad, and a joy stick. Each of such devices controls movement of a cursor on a computer screen and include buttons for entering specific command functions.

Conventionally, the mouse is tethered to a host computer by a cable, or another flexible or rigid linking mechanism. One undesired effect of the cable is that it restricts movement of the mouse.

Another shortcoming of the conventional mouse relates to portable computing. A large portion of the personal computer market is for portable computers, such as laptop computers, notebook computers, sub-notebook computers and hand-held or palmtop computers. The mouse is a tethered device, so it typically is detached and stored in a carrying case with the portable computer. Such mouse takes up scarce space in the carrying case.

In commonly assigned U.S. Pat. No. 5,428,355 a flexible linking mechanism connects the mouse to the host computer. This flexible linking mechanism is part of the tracking device, the remainder of which is contained inside the computer. This type of tracking device is acceptable only for computers that have space available for containment of the tracking device and storage for the mouse. Accordingly, there is a need for a computer mouse which overcomes these shortcomings.

SUMMARY OF THE INVENTION

According to the invention, a computer mouse is conveniently stored by collapsing the mouse into a smaller form. In some embodiments the computer mouse includes a cable to tether the mouse to a host computer. In other embodiments the computer mouse is wireless, including a wireless transmission medium for communicating with the host computer.

According to one aspect of the invention, the computer mouse is adjustable between a first operable configuration and a second, reduced-volume, storage configuration. In various embodiments different mechanisms are used to allow alteration of the mouse configuration between the operable configuration and the storage configuration.

According to another aspect of this invention, in one embodiment a cover portion of the computer mouse moves between an extended position and a retracted position. With the cover in the extended position, the mouse has a desirably contoured shape suitable for hand-held operation. This corresponds to the operable configuration. With the cover in the retracted position the mouse is reduced in length. This corresponds to the storage configuration.

According to another aspect of the invention, to move the cover from the retracted to the extended position, the cover is slid along a track. The cover slides into the extended position where it lowers into place providing a smooth contoured upper surface formed by the cover and an adjacent housing component. To move the cover from the extended to the retracted position, the cover is lifted, then slid along the track. In various embodiments, the cover moves along an upper surface over the mouse buttons to conceal and protect the buttons while in the retracted position, or along an undersurface of the mouse. The mouse occupies a smaller volume in the storage configuration than in the operable configuration. In particular the length of the mouse is reduced in the storage position in one embodiment of the invention.

According to another aspect of the invention, in another embodiment the mouse includes a lever which moves between a first position and a second position to change the mouse configuration from the operable configuration to the storage configuration. While in the operable configuration the mouse has a generally convex surface with one or more mouse buttons accessible for use. When the lever is moved from the first position to the second position, the lever covers the mouse buttons and collapses the bulk of the mouse to reduce the height and generally flatten the mouse. When the lever is moved from the second position to the first position, the buttons are revealed and the bulk of the mouse is propped up to provide a generally convex surface for the user's palm.

According to another aspect of the invention, in yet another embodiment the mouse is formed to a generally convex shape in the operable configuration by a contoured leaf spring. When the leaf spring is relaxed, the spring is generally convex, so as to shape an overlying rubber-like surface into the convex shape desirable for the operable configuration. In the storage configuration, the leaf spring is extended to be held generally flat by a latch. To change from the storage configuration to the operable configuration, the operator pulls on the latch releasing the spring. The spring then returns to its relaxed, convex shape, and correspondingly the mouse changes to the operable configuration. To change from the operable configuration to the storage configuration, the operator merely pushes down on the convex surface of the mouse until the metal spring is grasped and locked into the flattened shape by the latch. While in the flattened shape of the storage configuration, the mouse has a reduced height compared to the height when in the convex shape of the operable configuration.

According to another aspect of the invention, in yet another embodiment the mouse folds in half about a pivot axis to move from the operable configuration to the storage configuration. While in the operable configuration the mouse has a desired generally convex surface. When the mouse is folded, the mouse length is reduced. The mouse is unfolded to change to the operable configuration.

According to another aspect of the invention, a cable, when present, is spring-loaded to retract into the mouse body during storage.

According to another aspect of the invention, a case for the computer mouse is dimensioned to house the mouse while in the reduced-volume storage configuration. In one embodiment the case is adhered, clasped or otherwise permanently or removably attached to the AC adapter of the portable computer. In another embodiment, a storage area is provided within the portable computer case, such as in the underside of the computer, within the battery area or within the port and connector area of the computer.

According to an advantage of the invention, the collapsible mouse reduces the mouse volume while in the storage configuration allowing for easier storage and transport. In various embodiments the mouse length or height is reduced while in the storage configuration. According to another advantage of the invention, an operator can quickly change the mouse between the operable configuration and the storage configuration. These and other aspects and advantages of the invention will be better understood by reference to the following detailed description taken in conjunction with the accompanying drawings.

BRIEF DESCRIPTION OF THE DRAWINGS

FIG. 4 is a perspective view of a collapsible length mouse according to an embodiment of this invention;

FIG. 5 is a perspective view of the mouse of FIG. 4 in an intermediate position between an operable configuration and a storage configuration;

FIG. 6 is a perspective view of the mouse of FIG. 4 in the storage configuration according to an embodiment of this invention;

FIG. 7 is a planar side view of a housing of the mouse of FIG. 4;

FIG. 8 is a sample cross-section of a cover of the mouse of FIG. 4;

FIG. 9 is a perspective view of a portion of the cover of the mouse of FIG. 4;

FIG. 10 is a diagram of the cover rail and housing track of the mouse of FIG. 4;

FIG. 11 is a perspective view of a collapsible height mouse according to an embodiment of this invention;

FIG. 12 is a perspective view of the mouse of FIG. 11 in an intermediate position between an operable configuration and a storage configuration;

FIG. 13 is a perspective view of the mouse of FIG. 11 in the storage configuration according to an embodiment of this invention;

FIG. 14 is a perspective view of a collapsible height mouse according to another embodiment of this invention;

FIG. 15 is a perspective view of the mouse of FIG. 14 in the storage configuration according to an embodiment of this invention;

FIG. 16 is a perspective view of a leaf spring and latch of the mouse of FIG. 14 with the leaf spring in a relaxed state;

FIG. 17 is a perspective view of a leaf spring and latch of the mouse of FIG. 14 with the leaf spring captured in an extended state by the latch;

DESCRIPTION OF SPECIFIC EMBODIMENTS

Overview

Figure 1:
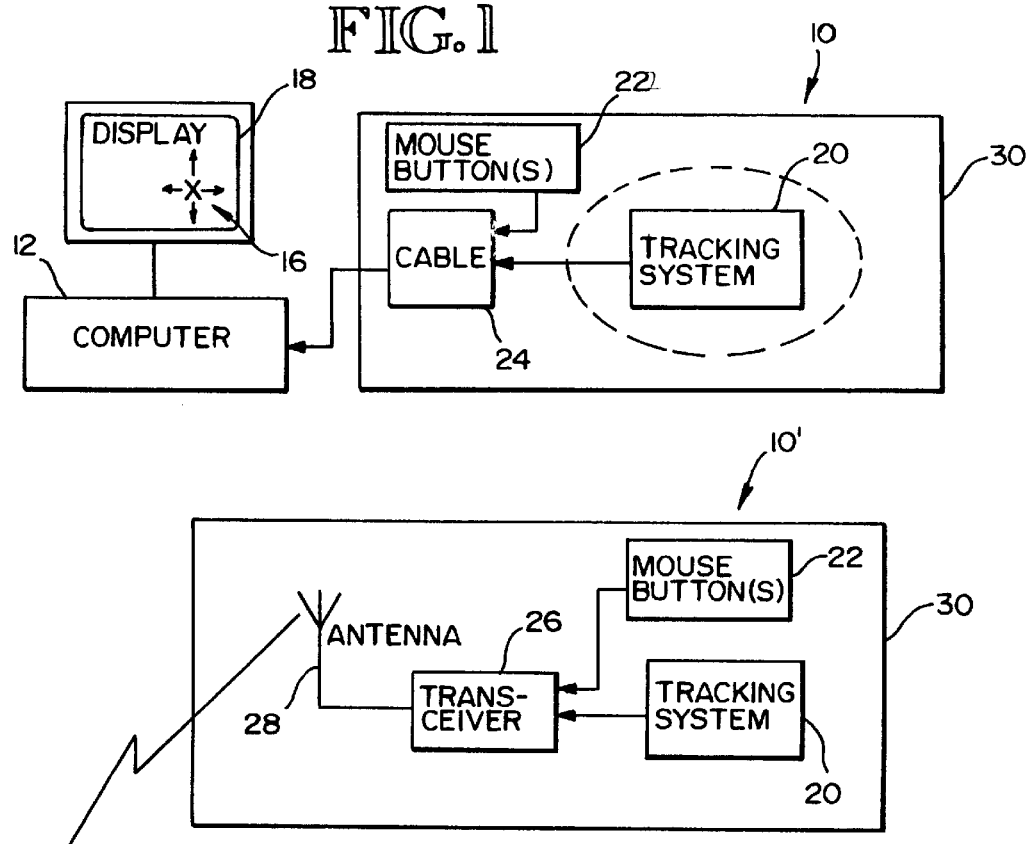
FIG. 1 is a diagram of a mouse coupled to a host computer by a cable.
Figure 2:
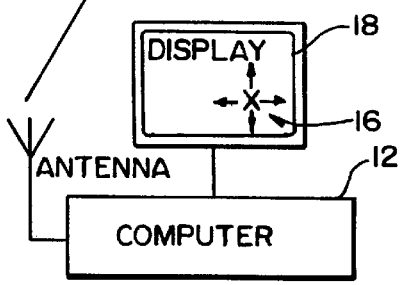
FIG. 2 is a diagram of mouse coupled to a host computer by a wireless transmission medium.

Referring to FIGS. 1 and 2, a computer mouse 10/10' is used with a host computer 12 to control the movement of a cursor 16 or other reference displayed on a computer screen 18. The mouse 10/10' includes a tracking system 20, one or more mouse buttons 22 and a communication interface packaged in a body 30. In one embodiment of the mouse 10 the communication interface includes a wire cable 24. In another embodiment of the mouse 10' the communication interface includes a transceiver 26 (or a transmitter) and an antenna 28. Signals generates by the tracking system 20 and buttons 22 are sent to the computer 12 through the communication interface using a prescribed protocol.

For the embodiment including the cable 24, the cable is either detachable, fixed or retractable. For example a detachable cable has two connectors. One connects to the mouse 10. The other connects to the computer 12 or a computer peripheral. A fixed cable extends from the mouse and remains at a fixed length. A retractable cable retracts into a body of the mouse for storage. For example, in a preferred embodiment, the cable 24 is spring-loaded to automatically retract into the body 30 and wind around the tracking system 20. The cable is uncoiled when pulled at an end to prepare the mouse for operation.

In a preferred embodiment the tracking system is an optical system which measures changes in position by optically acquiring images (frames) and mathematically determining the direction and magnitude of movement. In one embodiment the tracking system includes a sensor, lens and LED assembly manufactured by Hewlett-Packard Company of Palo Alto, Calif., part numbers HDNS-2000 (sensor), HDN-2100 (lens), HDNS 2200 (LED) assembly clip) and HLMP-ED80 (5 mm red LED). Such a tracking system embodiment includes no moving parts and allows tracking of the mouse along any surface. Although a specific optical embodiment is described, other optical or mechanical based tracking systems also may be used.

Although other tracking systems may be used, it is preferable that the size of the tracking system be kept minimal to allow the mouse 10/10' to be stored in a reduced volume configuration. In particular, an optical tracking system is preferred over a mechanical system housing a captured ball, because an optical based system takes up considerably less height and space. Further, an optical based tracking system allows the mouse to be used along surfaces which are not planar. Thus, the mouse need not be limited to use on a generally planar mouse pad. For example a portable computer user could run the mouse along their leg to control cursor location.

Figure 3:
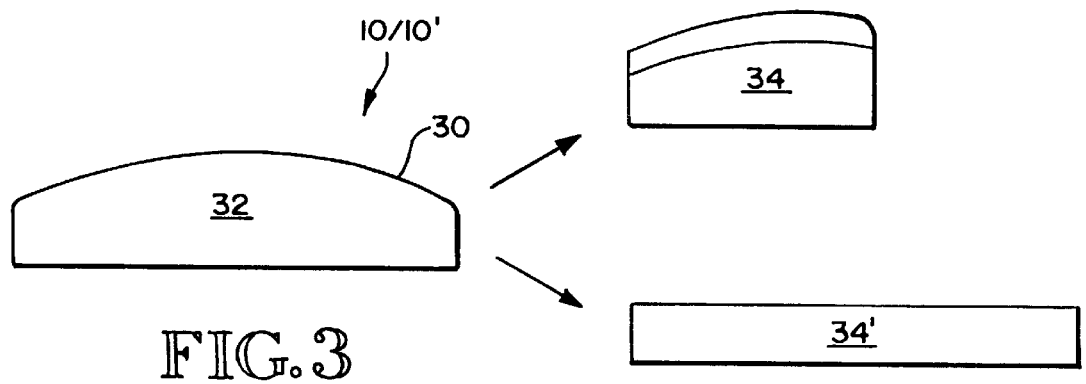
FIG. 3 is a diagram of a mouse in an operable configuration and in collapsed storage configurations.

Referring to FIG. 3, the mouse 10/10' includes an operable configuration 32 in which the mouse body 30 has an ergonomically-desired shape for hand-held operation of the mouse by a user. The mouse 10/10' is collapsible to a reduced volume for storage and transport. In one embodiment the mouse is reduced in length to achieve a storage configuration 34. In another embodiment the mouse is reduced in height to achieve the storage configuration 34'.

Reduced-Length Collapsible Mouse Embodiment

Referring to FIGS. 4–10, an embodiment of the mouse 10 is shown as a collapsible length mouse 40. Although the mouse 40 is shown with a cable 24, in an alternative embodiment the mouse 40 may embody the mouse 10' as a wireless mouse. The body of mouse 40 includes a housing 42 which houses the tracking system 20 and the communication interface. In addition, the mouse buttons 22 are exposed to form part of the housing 42.

The mouse body also includes a cover 44 which moves between a first position and a second position. Various structures may be implemented to allow movement of the cover 44 between the first position and the second position. In one embodiment the housing 42 includes a track 46 along which a rail 48 of the cover 44 is able to move. To change from the storage configuration 34 (see FIG. 6) to the operable configuration 32 (see FIG. 4), the cover 44 is slid by the operator from the second position to the first position in a direction 50. In some embodiments a bump or other structure is surmounted at the start of the motion to release the cover. Such bump (not shown) serves to keep the cover from gliding when the mouse is being stored or transported.

As the cover rail 48 traverses the track 46, the rail 48 runs off the rear edge 52 of the housing 42 (see FIG. 10) until a protrusion 54 in the cover 44 reaches the rear edge 52. Referring to FIG. 10, the rear surface of the housing 42 has an opening for the track 46. Such opening is to a distance b along the rear surface 52. The width d1 of the rail 48 is less than the distance b, allowing the rail 48 to run off the track 46. The protrusion 54 however has a width d2 which is greater than distance b and width d1. The opening is not big enough for the protrusion 54. Thus, the protrusion blocks the cover 44 from sliding all the way off the track and separating from the housing 42. Rather than slide off the track 46, the protrusion 54 moves downward into an adjacent notch 56 at the end of the track 46. The cover being a generally rigid structure moves down also allowing the cover 44 to settle into the first position. The mouse 40 now is in the operable configuration 32 (see FIG. 4).

To store the mouse 40, the cover is lifted to raise the protrusion 54 from the notch 56 and advance the protrusion 54 and rail 48 along the track 46. Accordingly, the cover is moved in a direction 60 (see FIG. 5). The cover 44 is slid in direction 60 until snapping into place by traversing the bump structure (not shown) in the second position. This corresponds to the storage configuration 34 (see FIG. 6). In the embodiment illustrated, the cover 44 conceals the buttons 22 and the communication interface while in the storage configuration. In other embodiments, only a portion of the buttons or none of the buttons are concealed. Still further in some embodiments the cover need not conceal the communication interface. In some embodiments the cable 24 is spring-loaded to retract into the mouse 40 (e.g., when changing into the storage configuration). In one embodiment the cable 24 winds around the tracking system 20 within the housing 42.

Although the cover is shown to move along an upper surface of the housing 42, in an alternative embodiment the cover may instead move along an opposite undersurface of the housing 42. Further, although a rail and track are described for allowing movement of the cover between the first position and the second position, other structures may be used instead to allow such movement. For example, the cover may be spring-biased in a downward direction, but be liftable away from the housing 42 by the operator. The cover, for example may lock into place at the first position and second position and be lifted opposing the spring-biasing to allow movement of the cover from one such position to the other position. In another embodiment the cover may be hinged to the housing 42 and rotate about the hinge in one direction for storage and rotate in another direction for operation. Thus, one face of the cover is exposed when the cover is positioned for storage and another face is exposed when the cover is positioned for operation of the mouse. Such hinged cover may rotate the cover to conceal an upper surface of the housing 42 (i.e., surface with buttons 22) or to cover an underside of the housing 42.

Lever-Driven Collapsible Mouse

Referring to FIGS. 11–13, a collapsible height mouse 62 embodies the mouse 10 or mouse 10' of FIGS. 1 and 2. The body of mouse 62 includes a housing 64 and a lever 66. The housing 64 houses the tracking system 20 and the communication interface. The mouse buttons 22 are exposed to form part of the housing 64.

The lever 66 moves between a first position and a second position to collapse the mouse 62 from a first height to a reduced second height. FIG. 11 shows the mouse in the operable configuration 32 with the lever 66 in the first position and the mouse having the first height. FIG. 13 shows the mouse 62 in the storage configuration with the lever 66 in the second position and the mouse at the reduced, second height. In one embodiment the mouse 64 is generally flat while in the storage configuration 34.

Preferably the housing 64 includes a flexible rubber-like upper surface which allows the housing to flex along its length. The lever 66 includes a lever arm section 70 and a support arm 72. While the mouse 62 is in the operable configuration 34, the support arm 72 supports the underside of the housing upper surface 68 providing a generally convex shape to the housing 64.

To collapse the mouse 62, the lever arm is moved from the first position to the second position rotating the lever 66 in direction 74. This collapses the housing 64 in a direction 76. Such collapsing occurs as the support arm 72 is rotated about an axis 78 formed by the lever 66. As the lever arm is rotated in direction 74, the support arm eventually extends parallel with the housing 64 upper surface. As the lever arm continues to rotate in direction 74 the lever arm section 70 moves relative to the support arm 72 about axis 78. When the lever 66 reaches the second position (see FIG. 13) the support arm 74 and lever arm section 72 are generally parallel extending with the length of the housing 64. This position corresponds to the reduced height storage configuration of the mouse 62.

To prepare the mouse for operation, the lever 66 is moved from the second position toward the first position in direction 80 (see FIG. 12). At the beginning of the motion, the lever arm portion 70 rotates in direction 80 while the support arm remains stationary. Eventually, the continued rotation of the lever arm portion 70 brings a notch (not shown) into contact with the support arm 72 forcing the support arm 72 to move with the lever arm portion 70. During the continued motion of the lever 66, the support arm lifts the upper surface 68 of the housing 64 in a direction 82 toward the increased, first height.

Spring-Loaded Collapsible Mouse

Referring to FIGS. 14–17, another collapsible height mouse 90 also embodies the mouse 10 or mouse 10' of FIGS. 1 and 2. The body of mouse 90 includes a housing 92 and a leaf spring 94. The housing 92 houses the tracking system 20 and the communication interface. The mouse buttons 22 are exposed to form part of the housing 92.

The leaf spring 94 has a contoured relaxed state and a generally flattened extended state. A flexible rubber-like upper surface 96 of the housing 92 is supported by the leaf spring 94. More particularly, the leaf spring defines the general contour of the upper surface 96 upon which an operator's palm rests during use. FIG. 14 shows the mouse 90 in the operable configuration 32 with the leaf spring 94 in the relaxed contoured state. Accordingly, the mouse 90 has a generally convex shape and reaches to a first height. This corresponds to the operable configuration. FIG. 15 shows the mouse 90 in the storage configuration 34 with the leaf spring captured in an extended flattened state. Accordingly, the mouse 90 has a generally flat shape and reaches to a reduced, second height. This corresponds to the storage configuration.

To extend the leaf spring, the operator merely pushes down on the upper surface 96 of the housing in an effort to flatten the housing 92. This reduces the height to the second height and moves the mouse from the operable configuration to the storage configuration.

To release the leaf spring 94, the operator presses on a latch 98 button 104. The leaf spring 94 in response returns to its contoured relaxed state. The housing correspondingly follows the contour of the spring 94 and increases height to the first height putting the mouse into the operable configuration. Preferably the spring constant of the leaf spring 94 is high enough to allow the mouse 90 to support an operator's hand without collapsing into the storage configuration.

Referring to FIGS. 16 and 17, in one embodiment the latch 98 includes hooks 100 which clasp an end 102 of the leaf spring to hold the leaf spring 94 in the extended position. Depressing the button 104 of the latch 98 releases a spring 106 of the latch which moves the hooks out of contact with the end of the leaf spring 94. In response the leaf spring moves to its relaxed state. When the operator flattens the mouse 90, the leaf spring extends pushing against the latch and causing the latch to move the hooks 100 in clasping position. The hooks 100 stay in the clasping position until released by button 104.

Folding Mouse

Figure 18:
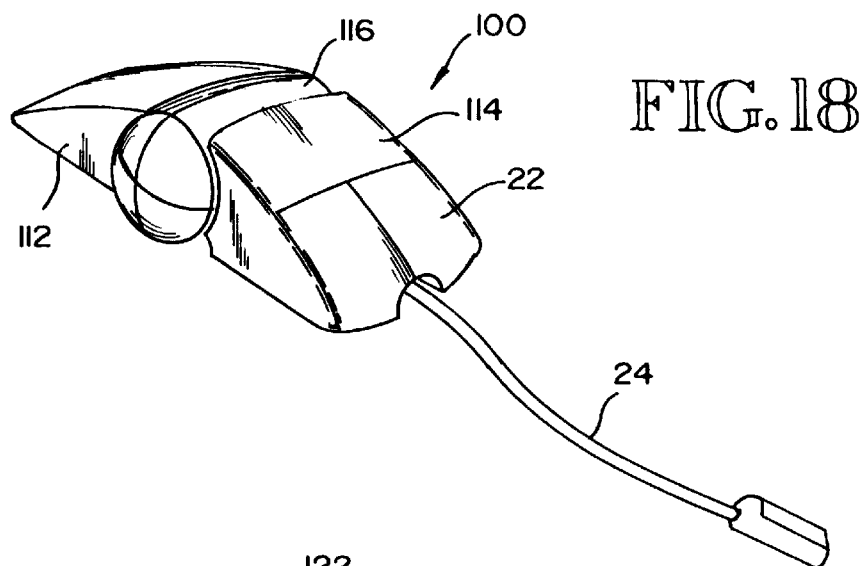
FIG. 18 is a perspective view of a folding mouse according to an embodiment of this invention.
Figure 19:
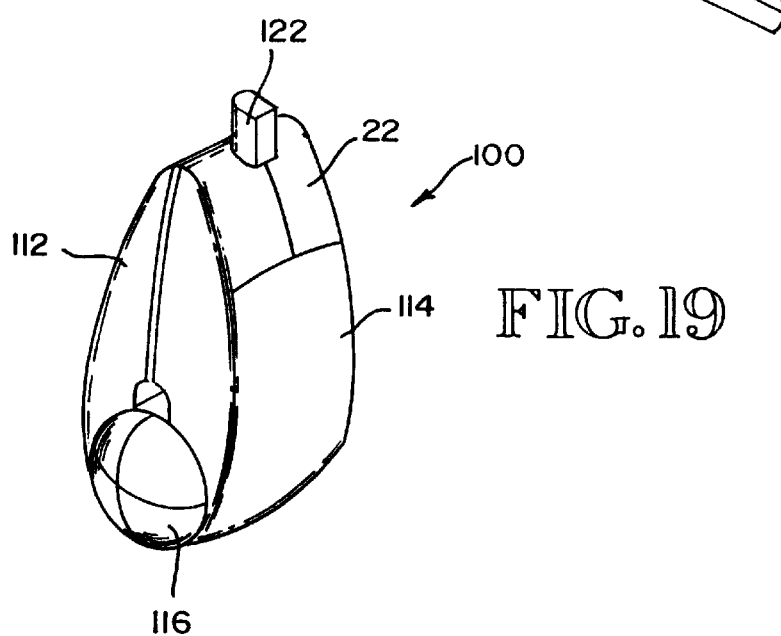
FIG. 19 is a perspective view of the mouse of FIG. 18 in the storage configuration.
Figure 20:
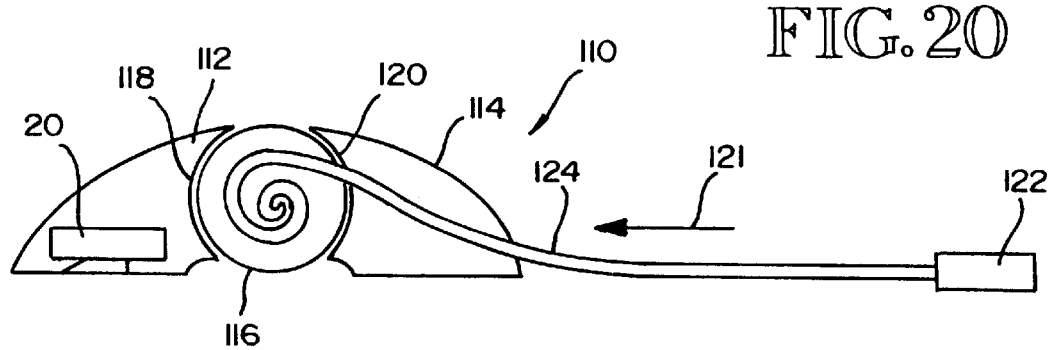
FIG. 20 is another perspective view of the mouse of FIG. 18 in the operable configuration.

Referring to FIGS. 18–20, an embodiment of the mouse 10 is shown as a collapsible length mouse 110. Although the mouse 110 is shown with a cable 24, in an alternative embodiment the mouse 110 may embody the mouse 10' as a wireless mouse. The body of mouse 110 includes a first housing 112, and a second housing 114 and a hinge 116. The first housing 112 houses the tracking system 20 and the communication interface. In addition, the mouse buttons 22 are exposed to form part of the first housing 112 or the second housing 114.

The mouse 110 changes between the storage configuration and the operable configuration by moving the first housing and second housing about the hinge 116. In one embodiment the hinge is a cylindrical structure. Each of the first housing 112 and the second housing 114 have an edge 118, 120 respectively contoured to the cylindrical hinge 116. FIG. 18 shows the mouse 110 in the operable configuration, in which the first and second housing 112, 114 are extended about the hinge 116 allowing for a first length of the mouse 110.

In the operable configuration, the upper surfaces of the first housing 112, the second housing 114 and the hinge 116 form a generally convex upper surface upon which an operator's palm rests. The cable 24, if present, extends from one of the first housing 112 and the second housing 114. To move into the storage configuration, the mouse 110 is folded about the hinge 116. Specifically, the second housing 114 and/or the first housing 112 moves about the hinge 116 to fold the mouse 110 in half, as shown in FIG. 19. In the storage configuration of FIG. 19, the mouse 110 has a reduced length relative to the length while in the operable configuration.

In various embodiments the cable 24 retracts in direction 121 into the mouse 110 to allow easy storage. Referring to FIG. 20, the cable 24 winds up within the cylindrical hinge 116. In one embodiment, the hinge 116 is rotatable even while the mouse 110 is in the storage configuration to allow the operator to wind up the cable 124 by turning the hinge 116. In another embodiment the cable is spring-loaded. When the operator folds the mouse 110, the spring loading force retracts the cable into the mouse 110 to be wound up within the hinge 116. To extend the cable the operator pulls the cable 24 at connector 122.

Portable Computer Mouse Storage Areas

Figure 21:
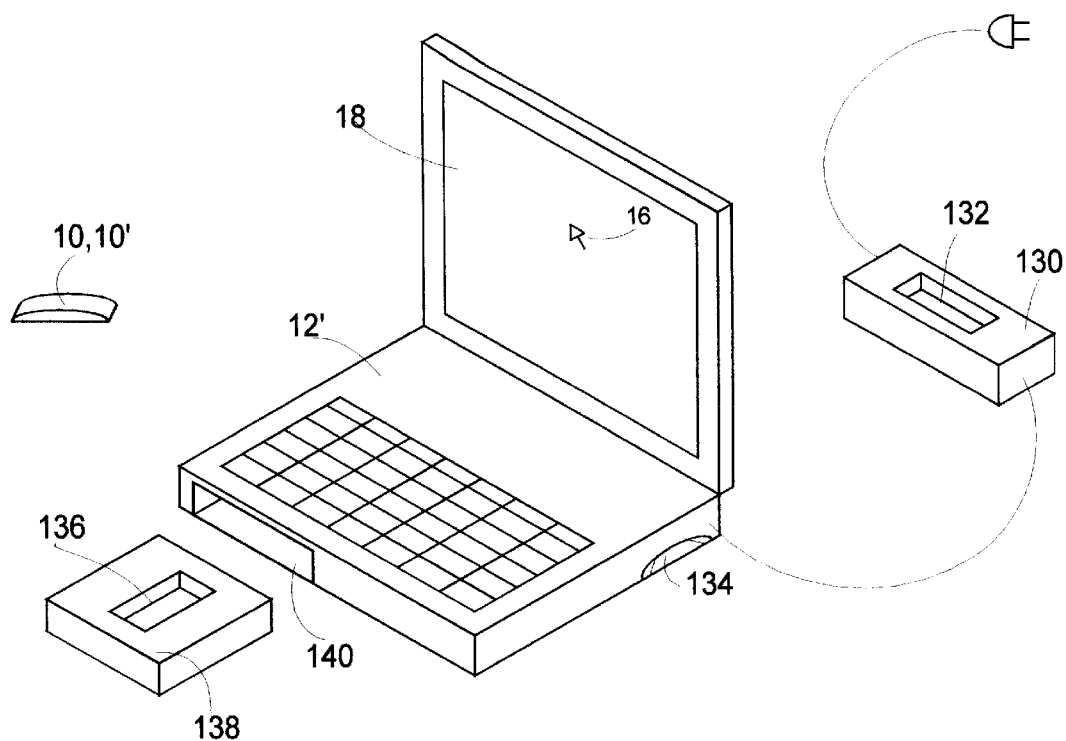
FIG. 21 is a perspective view of an exemplary host computer, a portable computer, which illustrates several possible storage areas to store a mouse having an embodiment of the invention.

FIG. 21 is a perspective illustration of an exemplary host computer, a portable computer 12'. Portable computer 12' has a computer screen 18 having a cursor 16 controlled by a pointing device, a mouse 10/10' incorporating at least one embodiment of the invention. Mouse 10/10' can be adjusted between a first operable position and a second reduced volume storage configuration. When in the reduced volume storage configuration, mouse 10/10' can be stored in the portable computer 12' or other accessory by configuring a mouse storage area to adhere, clasp or otherwise removably attach the mouse case. Preferably the mouse 10/10' is stored near the connector and port area in connector storage area 134. Alternatively, the mouse 10/10' can be stored in an AC adapter 130 in adapter storage area 132. Yet another alternative for storing the mouse 10/10' with the portable computer 18 is to provide a carrier 138 that can be inserted in a battery slot 140 or a mass storage drive bay of the portable computer 12'. The carrier 138 is configured to accept mouse 10/10' in its storage configuration state in carrier mouse storage area 136.

Figure 22:
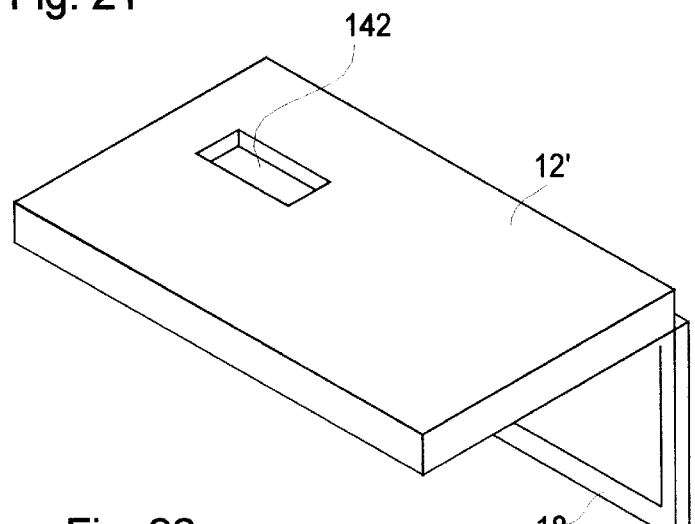
FIG. 22 is another perspective view of the portable computer of FIG. 21 illustrating another exemplary mouse storage area.

FIG. 22 is a perspective illustration of the portable computer 12' of FIG. 21 oriented to observe the underside of the portable computer 12'. Another alternative for storing mouse 10/10' in its reduced volume configuration is provided by underside mouse storage area 142. Although several mouse storage areas have been illustrated, preferably only one mouse storage area is implemented on a portable computer although multiple storage areas as well as other possible storage areas would still meet the spirit and scope of the invention.

Meritorious and Advantageous Effects

According to an advantage of the invention, the collapsible mouse reduces the mouse volume while in the storage configuration allowing for easier storage and transport. In various embodiments the mouse length or height is reduced while in the storage configuration. According to another advantage of the invention, an operator can quickly change the mouse between the operable configuration and the storage configuration.

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A pointing apparatus controlling movement of an on-screen reference for a computer, comprising:
    a tracking device which generates movement signals based on movement of the pointing apparatus, the movement signals for controlling the movement of the onscreen reference;

a body within which the tracking device is housed, the body adjustable in shape between an operable configuration and a storage configuration; and a button which is pressable to generate an input to the computer, said button being concealed while the body is in the storage configuration and being exposed while the body is in the operable configuration.

2. The pointing apparatus of claim 1, wherein the body occupies less volume in the storage configuration than in the operable configuration.

3. The pointing apparatus of claim 1, wherein the body has a first length while in the operable configuration and a reduced second length while in the storage configuration.

4. The pointing apparatus of claim 1, wherein the body has a first height while in the operable configuration and a reduced second height while in the storage configuration.

5. The pointing apparatus of claim 1, in which the body comprises:

a housing portion which houses the tracking device; and a cover which moves relative to the housing portion to adjust the body between the operable configuration and the storage configuration.

6. The pointing device of claim 5, in which the cover includes a surface which extends flush with the housing portion while the body is in the operable configuration and overlaps the housing portion while the body is in the operable configuration.

7. The pointing apparatus of claim 6, further comprising a button which is pressable to generate an input to the computer, said button being concealed by the cover while the body is in the storage configuration and being exposed while the body is in the operable configuration.

8. The pointing apparatus of claim 1, further comprising:

a retractable cable electrically coupled to the tracking device, a least a portion of the cable being retractable into the body.

9. The pointing apparatus of claim 1, further comprising:

a transmitter electrically coupled to the tracking device and an antenna coupled to the transmitter, the transmitter routing the movement signals from the tracking device to the computer through a wireless media.

10. The pointing apparatus of claim 1, further comprising a lever coupled to the body and movable between a first position and a second position, wherein movement of the lever from the first position to the second position changes the body shape from the operable configuration to the storage configuration.

11. The point apparatus of claim 10, wherein movement of the lever from the second position to the first position changes the body shape from the storage configuration to the operable configuration.

12. The pointing apparatus of claim 11, wherein the lever props the body to have an exposed convex surface while in the first position.

13. The pointing apparatus of claim 1, in which the body comprises:

a leaf spring having a generally convex shape while in a first state and a reduced contour shape while in a second state;

a latch which locks the leaf spring into one state of either the first state and second state, wherein a releasing of the latch allows the leaf spring to return to the other state of the first state and the second state, wherein the generally convex shape of the leaf spring corresponds to the operable configuration and the reduced contour shape corresponds to the storage configuration.

14. The pointing apparatus of claim 13, in which the reduced contour shape is generally flat.

15. The pointing apparatus of claim 13, further comprising a flexible surface covering the leaf spring, wherein the leaf spring shape generally defines shape of an outer surface of the body.

16. The pointing apparatus of claim 1, in which the tracking device comprises an optical sensor for optically monitoring navigation of the pointing apparatus.

17. The pointing apparatus of claim 1, in which the body is foldable to change from an extended operable configuration to a reduced length storage configuration, the body comprising a first housing, a second housing and a hinge, wherein either one or both of the first housing and second housing move relative to the hinge to change the body between the operable configuration and the storage configuration.

18. The pointing apparatus of claim 16, further comprising a cable which winds up within the hinge into a retracted cable position.

19. The pointing apparatus of claim 1 wherein when the body is in the storage configuration, the pointing apparatus is capable of being stored in the computer.

20. The pointing apparatus of claim 1 wherein when the body is in the storage configuration, the pointing apparatus is capable of being stored in an AC adapter.

21. The pointing apparatus of claim 1 wherein when the body is in the storage configuration, the pointing apparatus is capable of being stored in a carrier, and wherein the carrier with the pointing apparatus is further capable of being stored in the computer.

22. A method for operating a pointing apparatus to control movement of an on-screen reference for a computer, the pointing apparatus having a tracking device and a body, the tracking device housed within the body, the method comprising the steps of:

adjusting shape of the body from a storage configuration to an operable configuration;

generating with the tracking device movement signals which are based on the movement of the pointing apparatus, in which the body includes a housing portion which houses the tracking device, and a cover which moves relative to the housing portion, and wherein the step of adjusting comprises sliding the cover relative to the housing portion to change the body to the operable configuration, wherein the pointing apparatus also includes a button for generating an input to the computer, wherein the step of adjusting comprises sliding the cover relative to the housing portion to reveal the buttons and change the body into the operable configuration.

23. The method of claim 22, further comprising the step:

controlling with the computer movement of the on-screen reference in response to the movement signals, wherein the computer is in communication with the pointing apparatus to receive the movement signals.

24. The method of claim 22, in which the step of adjusting comprises:

altering volume of the pointing apparatus to have an increased volume while in the operable configuration.

25. The method of claim 22, in which the step of adjusting comprises:

altering height of the pointing apparatus to have an increased height while in the operable configuration.

26. The method of claim 22, in which the step of adjusting comprises:
  altering length of the pointing apparatus to have an increased length while in the operable configuration.

27. The method of claim 22, in which the step of adjusting comprises:
  altering shape of the pointing apparatus to have a generally convex shape while in the operable configuration.

28. The method of claim 22, further comprising the step of:
  extending a cable retracted into the body into an extended position, wherein the cable is electrically coupled to the tracking device.

29. The method of claim 22, in which the pointing apparatus also includes a lever coupled to the body and movable between a first position and a second position, wherein the step of adjusting comprises the step of:
  moving the lever from the second position to the first position to change the body shape from the storage configuration to the operable configuration.

30. The method of claim 29, in which the step of adjusting further comprises the step of:
  propping the body to have an exposed convex surface while the lever is in the first position.

31. The method of claim 22, in which the pointing apparatus also includes a latch and a leaf spring, the leaf spring having a generally convex shape while in a first state and a reduced contour shape while in a second state, and further comprising the steps of:
  securing the leaf spring with the latch into in one state of the first state and the second state;
  releasing the leaf spring from the latch to return the leaf spring to the other state of the first state and the second state, and
  wherein the generally convex shape of the leaf spring corresponds to the operable configuration and the reduced contour shape corresponds to the storage configuration.

32. The method of claim 22, in which the body includes a first housing, a second housing and a hinge, and further comprising the step of:
  folding the first housing and second housing about the hinge to reduce length of the body.

33. The method of claim 32, in which the pointing apparatus includes a cable, and further comprising the step of:
  retracting the cable within the hinge.

34. A pointing apparatus using the method of claim 22.

* * * * *